US012801635B2

(12) United States Patent
Lin et al.

(10) Patent No.: US 12,801,635 B2
(45) Date of Patent: Nov. 17, 2026

(54) HIERARCHICAL PERIODICITY DETECTION ON DYNAMIC GRAPHS SYSTEM AND METHOD

(71) Applicant: VISA INTERNATIONAL SERVICE ASSOCIATION, San Francisco, CA (US)

(72) Inventors: Yu-San Lin, San Francisco, CA (US); Lan Wang, San Francisco, CA (US); Yuhang Wu, San Francisco, CA (US); Huiyuan Chen, San Francisco, CA (US); Fei Wang, San Francisco, CA (US); Hao Yang, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 88 days.

(21) Appl. No.: 18/568,778

(22) PCT Filed: Jun. 10, 2022

(86) PCT No.: PCT/US2022/033022
§ 371 (c)(1),
(2) Date: Dec. 8, 2023

(87) PCT Pub. No.: WO2022/261447
PCT Pub. Date: Dec. 15, 2022

(65) Prior Publication Data

US 2024/0289355 A1 Aug. 29, 2024

Related U.S. Application Data

(60) Provisional application No. 63/209,183, filed on Jun. 10, 2021.

(51) Int. Cl.
*G06F 16/28* (2019.01)

(52) U.S. Cl.
CPC .................................. *G06F 16/285* (2019.01)

(58) Field of Classification Search
None
See application file for complete search history.

(56) References Cited

U.S. PATENT DOCUMENTS

| | | | | |
|---|---|---|---|---|
| 9,536,268 B2 * | 1/2017 | Serena | .................... | H04L 51/52 |
| 10,728,105 B2 * | 7/2020 | Rossi | ...................... | G06N 20/10 |

(Continued)

FOREIGN PATENT DOCUMENTS

KR 101945406 B1 2/2019

OTHER PUBLICATIONS

Alsentzer et al., "Subgraph Neural Networks", Arxiv.org, Cornell University Library, Nov. 6, 2020, pp. 1-20.

(Continued)

*Primary Examiner* — Aleksandr Kerzhner
*Assistant Examiner* — Loan T Nguyen
(74) *Attorney, Agent, or Firm* — Kilpatrick Townsend & Stockton LLP

(57) ABSTRACT

A computer obtains node embeddings, node periodicity classifications, edge embeddings, and edge periodicity classifications for each time of a time period. The computer determines subgraph embeddings based on a subgraph of the graph, times in the time period, the node embeddings for nodes in the subgraph, the edge embeddings for edges in the subgraph, the node periodicity classifications for the nodes in the subgraph, and the edge periodicity classifications for the edges in the subgraph. The computer translates each subgraph embedding of the subgraph embeddings for each time of the time period into projected subgraph embeddings. For the subgraph, the computer aggregates the plurality of projected subgraph embeddings into an aggregated subgraph embedding. The computer determines if the subgraph is (Continued)

periodic based upon at least the aggregated subgraph embedding.

18 Claims, 7 Drawing Sheets

(56) References Cited

U.S. PATENT DOCUMENTS

| | | | | |
|---|---|---|---|---|
| 11,522,881 | B2 * | 12/2022 | Chen | H04L 63/1425 |
| 2007/0066628 | A1 * | 3/2007 | Zhang | C07D 207/34 514/269 |
| 2013/0031171 | A1 | 1/2013 | Serena | |
| 2017/0124452 | A1 * | 5/2017 | Tucker | G06N 7/01 |
| 2019/0095806 | A1 * | 3/2019 | Martinez Canedo | G06F 18/21 |
| 2020/0177466 | A1 * | 6/2020 | Rossi | G06N 20/20 |
| 2020/0356858 | A1 | 11/2020 | Hegde et al. | |
| 2021/0067527 | A1 * | 3/2021 | Chen | G06N 3/08 |

OTHER PUBLICATIONS

Application No. EP22821115.7 , Extended European Search Report, Mailed on Oct. 8, 2024, 11 pages.

Fournier-Viger et al., "A Survey of Pattern Mining in Dynamic Graphs", Wiley Interdisciplinary Reviews: Data Mining and Knowledge Discovery, vol. 10, May 20, 2020, pp. 1-30.

Li et al., "Gtea: Representation Learning for Temporal Interaction Graphs Via Edge Aggregation", Arxiv, Available online at :https://arxiv.org/abs/2009.05266v2, Sep. 28, 2020, pp. 9.

Zhang et al., "Revisiting Graph Neural Networks for Link Prediction", Arxiv.org, Cornell University Library, Feb. 12, 2021, pp. 18.

Zhou et al., "Graph Convolutional Architectures Via Arbitrary Order of Information Aggregation", Institute of Electrical and Electronics Engineers Access, vol. 8, May 18, 2020, pp. 92802-92813.

Barros et al., "A Survey on Embedding Dynamic Graphs", arXiv:2101.01229v2 [cs.LG], Jan. 4, 2021, pp. 1-41.

Haffey et al., "Modeling, Analysis, and Characterization of Periodic Traffic on a Campus Edge Network", 2018 IEEE 26th International Symposium on Modeling, Analysis, and Simulation of Computer and Telecommunication Systems (MASCOTS), Sep. 28, 2018, pp. 170-182.

Application No. PCT/US2022/033022 , International Search Report and Written Opinion, Mailed on Oct. 7, 2022, 12 pages.

Wang, et al., "Calendar Graph Neural Networks for Modeling Time Structures in Spatiotemporal User Behaviors", Applied Data Science Track Paper, University of Notre Dame, Notre Dame, IN, Aug. 23-27, 2020, pp. 2581-2589.

Thomas Kipf, "Neural Relational Inference for Interacting Systems", Proceedings of the 35th International Conference on Machine Learning, Stockholm, Sweden, PMLR 80, 2018, Copyright 2018, 10 pages.

* cited by examiner

HIERARCHICAL PERIODICITY DETECTION ON DYNAMIC GRAPHS SYSTEM AND METHOD

CROSS-REFERENCES TO RELATED APPLICATIONS

The present application is a 371 application of PCT application number PCT/US2022/033022, filed Jun. 10, 2022, and claims priority to U.S. Provisional Application 63/209,183, filed on Jun. 10, 2021, which are incorporated herein by reference for all purposes in their entirety.

BACKGROUND

Periodicity is a prevalent temporal pattern, and its presence ranges from natural phenomena such as lunar cycles and animal extinction, to man-made phenomena such as product pricing, and search engine activities. In addition to these attribute-level of periodicity (e.g., keyword search count over time), there also exists interaction-level of periodicity, such as the animals' interactions with each other, users exchanging emails with one another, employee logging in to severs, customers purchasing goods, etc.

Capturing periodical patterns and determining the underlying periodicity is highly beneficial for various applications and have been studied in terms of time series and event mining.

However, many periodical patterns exist beyond time series and the occurrences of events. More often, these patterns can be naturally formatted as dynamic graphs. For example, users in an email system can be viewed as nodes, and the emails exchanged between two users can be viewed as edges. In addition, the emails exchanged among a group of users can be captured by a subgraph (including multiple users and edges). Detecting the periodicity of nodes and edges can be straightforward, since their occurrences can both be viewed as events in a timeline and applying an event-based periodicity mining algorithm (e.g., ePeriodicity) can be sufficient. Nonetheless, finding the periodicity of subgraphs is not trivial for at least two reasons: the sparsity of subgraph appearances in the dynamic graphs' time spans, and the difficulties in obtaining high-quality subgraph embeddings.

Embodiments of the disclosure address this problem and other problems individually and collectively.

SUMMARY

One embodiment is related to a method comprising: obtaining, by a computer, node embeddings and node periodicity classifications for a plurality of nodes in a graph, and edge embeddings and edge periodicity classifications for a plurality of edges in the graph for each time of a time period; determining, by the computer, subgraph embeddings based on a subgraph of the graph, times in the time period, the node embeddings for nodes in the subgraph, the edge embeddings for edges in the subgraph, the node periodicity classifications for the nodes in the subgraph, and the edge periodicity classifications for the edges in the subgraph; translating, by the computer, each subgraph embedding of the subgraph embeddings for each time of the time period into projected subgraph embeddings of a plurality of projected subgraph embeddings; for the subgraph, aggregating, by the computer, the plurality of projected subgraph embeddings into an aggregated subgraph embedding; and determining, by the computer, if the subgraph is periodic based upon at least the aggregated subgraph embedding.

One embodiment is related to a computer comprising: a processor; and a computer-readable medium coupled to the processor, the computer-readable medium comprising code executable by the processor for implementing a method comprising: obtaining node embeddings and node periodicity classifications for a plurality of nodes in a graph, and edge embeddings and edge periodicity classifications for a plurality of edges in the graph for each time of a time period; determining subgraph embeddings based on a subgraph of the graph, times in the time period, the node embeddings for nodes in the subgraph, and the edge embeddings for edges in the subgraph, the node periodicity classifications for the nodes in the subgraph, and the edge periodicity classifications for the edges in the subgraph; translating each subgraph embedding the subgraph embeddings for each time of the time period into projected subgraph embeddings; for the subgraph, aggregating the plurality of projected subgraph embeddings into an aggregated subgraph embedding; and determining if the subgraph is periodic based upon at least the aggregated subgraph embedding.

One embodiment is related to a system comprising: a plurality of devices; a database; and a data analysis computer comprising: a processor; and a computer-readable medium coupled to the processor, the computer-readable medium comprising code executable by the processor for implementing a method comprising: obtaining, from the database, node embeddings and node periodicity classifications for a plurality of nodes in a graph, and edge embeddings and edge periodicity classifications for a plurality of edges in the graph for each time of a time period; determining subgraph embeddings based on a subgraph of the graph, times in the time period, the node embeddings for nodes in the subgraph, and the edge embeddings for edges in the subgraph, the node periodicity classifications for the nodes in the subgraph, and the edge periodicity classifications for the edges in the subgraph; translating each subgraph embedding the subgraph embeddings for each time of the time period into projected subgraph embeddings; for the subgraph, aggregating the plurality of projected subgraph embeddings into an aggregated subgraph embedding; and determining if the subgraph is periodic based upon at least the aggregated subgraph embedding.

Further details regarding embodiments of the disclosure can be found in the Detailed Description and the Figures.

DETAILED DESCRIPTION

Figure 1:
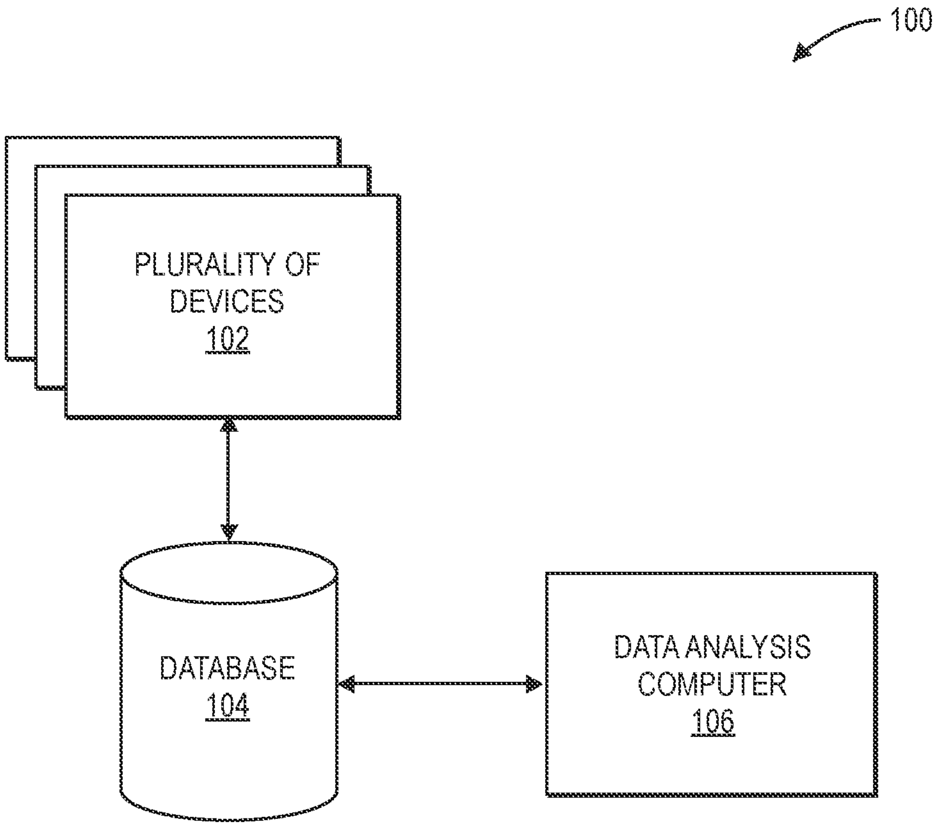
FIG. 1 shows a block diagram of a dynamic graph data processing system according to embodiments.

Prior to discussing embodiments of the disclosure, some terms can be described in further detail.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "resource provider" may be an entity that can provide a resource such as goods, services, information, and/or access. Examples of resource providers includes merchants, data providers, transit agencies, governmental entities, venue and dwelling operators, etc.

"Machine learning" can include an artificial intelligence process in which software applications may be trained to make accurate predictions through learning. The predictions can be generated by applying input data to a predictive model formed from performing statistical analyses on aggregated data. A model can be trained using training data, such that the model may be used to make accurate predictions. The prediction can be, for example, a classification of an image (e.g., identifying images of cats on the Internet) or as another example, a recommendation (e.g., a movie that a user may like or a restaurant that a consumer might enjoy).

In some embodiments, a model may be a statistical model, which can be used to predict unknown information from known information. For example, a learning module may be a set of instructions for generating a regression line from training data (supervised learning) or a set of instructions for grouping data into clusters of different classifications of data based on similarity, connectivity, and/or distance between data points (unsupervised learning). The regression line or data clusters can then be used as a model for predicting unknown information from known information. Once model has been built from learning module, the model may be used to generate a predicted output from a new request. A new request may be a request for a prediction associated with presented data. For example, a new request may be a request for classifying an image or for creating a recommendation for a user.

A "topological graph" or "graph" can include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

A "subgraph" or "sub-graph" can include a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

The term "node" can include a discrete data point representing specified information. Nodes may be connected to one another in a topological graph by "edges," which may be assigned a value known as an edge weight in order to describe the connection strength between the two nodes. For example, a first node may be a data point representing a first device in a network or a user in an interaction network, and the first node may be connected in a graph to a second node representing a second device in the network or a resource provider in the interaction network. In some embodiments, the connection strength may be defined by an edge weight corresponding to how quickly and easily information may be transmitted between the two nodes. An edge weight may also be used to express a cost or a distance required to move from one state or node to the next. For example, a first node may be a data point representing a first position of a machine, and the first node may be connected in a graph to a second node for a second position of the machine. The edge weight may be the energy required to move from the first position to the second position.

A "periodicity classification" can include an indication of whether or not something is periodic. A periodicity classification can classify a node or an edge as being "periodic" or as being "not periodic." In some embodiments, a periodicity classification can be a binary periodicity classification. In other embodiments, a periodicity classification can be a value in a range of continuous values.

An "embedding" can include a relatively low-dimensional space into which high-dimensional vectors can be translated. An embedding can be a mapping of a discrete—categorical—variable to a vector of continuous numbers. Neural network embeddings are useful because they can reduce the dimensionality of categorical variables and meaningfully represent categories in the transformed space. Embeddings can make it easier to perform machine learning on large inputs (e.g., sparse vectors representing words, etc.). An embedding can capture some of the semantics of the input by placing semantically similar inputs close together in the embedding space. An embedding can be learned and reused across models.

"Projected embeddings" can include embeddings that have be projected into an embedding space. A projected embedding can be created by translating an embedding from one embedding space to another embedding space. For example, a plurality of embeddings for a node, where each embedding is a node embedding for a time of a timespan, can each be projected into single embedding space. The single embedding space can be selected to be the embedding space of the final timestamp embedding space. However, it is understood that any embedding space can be selected.

"Aggregated embeddings" can include embeddings that have been combined into a single embedding. An aggregated embedding can be created from a plurality of projected embeddings. As such, the projected embeddings can represent a node at each time stamp, while the aggregated embedding can represent the node across each time stamp.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Table 1 illustrates definitions for various symbols that appear herein.

TABLE I

Symbol definitions

| Grouping of Usage | Symbol | Definition |
|---|---|---|
| Overall | $\mathcal{G}$ | Dynamic graph |
| | $\mathcal{V}$ | Vertex set over time |
| | $\varepsilon$ | Edge set over time |
| | $\mathcal{S}$ | Subgraph set over time |
| | $\mathcal{T}$ | Overall time span of the dynamic graph |
| | V(t) | Vertex set at time t |
| | E(t) | Edge set at time t |
| | S(t) | Subgraph set at time t |
| Node Embedding | $X_V$ | Node embedding (pre-projection) |
| | $X_V^*$ | Node embedding (post-projection) |
| | $C_i$ | i-th node reached during a random walk |
| | $\pi_{vx}$ | Transition probability from node v to x |
| | Z | Normalization constant |
| | $w_{vx}$ | Edge weight of (v, x) |
| | p | Weight for BFS walks |
| | q | Weight for DFS walks |
| | $\alpha_{pq}$ | Biased term for random walks |
| | $d_{tx}$ | Shortest path between t and x |
| Edge embedding | $X_e$ | Edge embedding (pre-projection) |
| | $X_e^*$ | Edge embedding (post-projection) |
| | $n_e$ | Neighborhood vector of edge e |
| | $W^{(n)}$ | Weight matrix of the n-th layer in encoder |
| | $M^{(n)}$ | Weight matrix of the n-th layer in decoder |
| | $b^{(n)}$ | Bias term of the n-th layer in encoder |
| | $d^{(n)}$ | Bias term of the n-th layer in decoder |
| | $x_e^*$ | Output from the n-th layer in encoder |
| | $y_e^*$ | Output from the n-th layer in decoder |
| | ep | Edge pair |
| | $\lambda$ | Number of negative samples |
| Subgraph embedding | $X_S$ | Subgraph embedding (pre-projection) |
| | $X_S^*$ | Subgraph embedding (post-projection) |
| | X | Message-passing channel |
| | $A_X$ | Anchor patch for channel X |
| | $a_X$ | Embedding of anchor path from channel X |
| Projection and Aggregation | $W^{*t \rightarrow T}$ | Projection matrix from t to T |
| | $W_h^*$ | RNN's encoding matrix |
| | $U_h$ | RNN's transition matrix |
| | $b_h$ | RNN's bias term |

FIG. 1 shows a system 100 according to embodiments of the disclosure. The system 100 comprises a plurality of devices 102, a database 104, and a data analysis computer 106. The plurality of devices 102 can be in operative communication with the database 104. The database 104 can be in operative communication with the data analysis computer 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The plurality of devices 102 can include any number of devices capable of obtaining data and/or performing interactions. Examples of user devices include user devices, mobile devices, access devices, resource provider devices, etc. Each device of the plurality of devices 102 can directly or indirectly (e.g., via an intermediate computer, not shown) provide data to a database 104 regarding interactions performed by the device.

For example, a first device of the plurality of devices 102, such as a user device, can perform an interaction, such as a transaction, with a second device of the plurality of devices 102, such as a resource provider computer. The first device and the second device can both provide data relating to the interaction to the database 104. For example, the first device and the second device can provide interaction data, device identifiers, device types (e.g., user device or resource provider device), and/or any other data relating to the devices or the interaction between the devices.

The database 104 can include an electronic storage system that can store data obtained by the plurality of devices 102. The database 104 can include any suitable database. The database 104 may be a conventional, fault tolerant, relational, scalable, secure database such as those commercially available from Oracle™ or Sybase™.

The data obtained by the plurality of devices 102 can be stored as a dynamic graph comprising a plurality of nodes and a plurality of edges. The plurality of nodes of the dynamic graph can represent the plurality of devices 102. The plurality of edges can represent interactions that occur between devices of the plurality of devices 102.

The data analysis computer 106 can include a computer or server computer capable of analyzing the data stored in the database. The data analysis computer 106 can obtain the data from the database 104 and analyze the data as described in further detail herein. For example, the data analysis computer 106 can determine whether or not a subgraph included in the graph is periodic.

Figure 2:
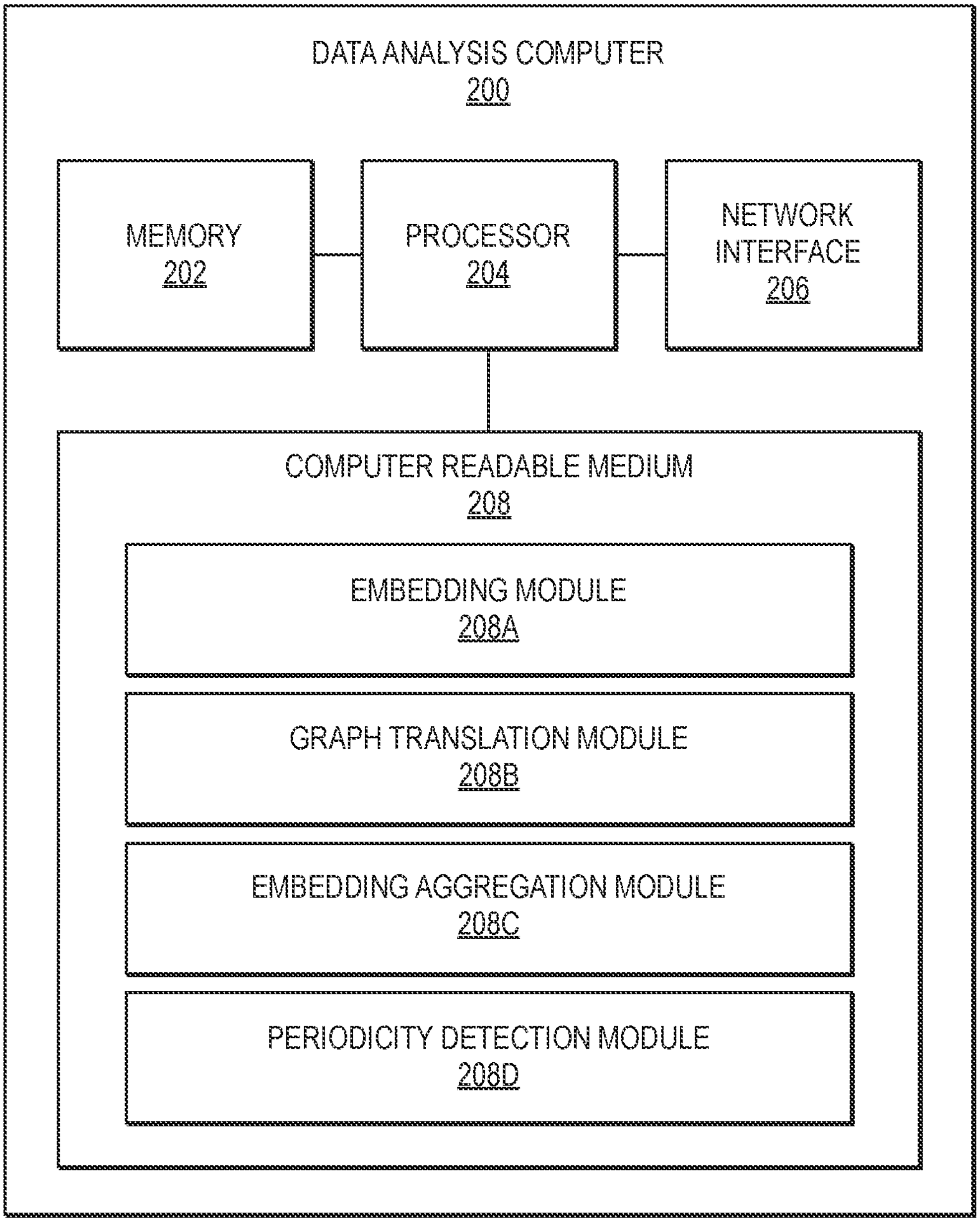
FIG. 2 shows a block diagram of components of a data analysis computer according to embodiments.

FIG. 2 shows a block diagram of a data analysis computer 200 according to embodiments. The exemplary data analysis computer 200 may comprise a processor 204. The processor 204 may be coupled to a memory 202, a network interface 206, and a computer readable medium 208. The computer readable medium 208 can comprise one or more modules including an embedding module 208A, a graph translation module 208B, an embedding aggregation module 208C, and a periodicity detection module 208D.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store graph data.

The computer readable medium 208 may comprise code, executable by the processor 204, for performing a method comprising: obtaining, by a computer, node embeddings and node periodicity classifications for a plurality of nodes in a graph, and edge embeddings and edge periodicity classifications for a plurality of edges in the graph for each time of a time period; determining, by the computer, subgraph embeddings based on a subgraph of the graph, times in the time period, the node embeddings for nodes in the subgraph, the edge embeddings for edges in the subgraph, the node periodicity classifications for the nodes in the subgraph, and the edge periodicity classifications for the edges in the subgraph; translating, by the computer, each subgraph embedding of the subgraph embeddings for each time of the time period into projected subgraph embeddings of a plurality of projected subgraph embeddings; for the subgraph, aggregating, by the computer, the plurality of projected subgraph embeddings into an aggregated subgraph embedding; and determining, by the computer, if the subgraph is periodic based upon at least the aggregated subgraph embedding.

The embedding module 208A may comprise code or software, executable by the processor 204, for embedding nodes, edges, and/or subgraphs. The embedding module 208A, in conjunction with the processor 204, can determine node embeddings for a plurality of nodes, determine edge embeddings for a plurality of edge embeddings, and a subgraph embedding for a subgraph. The embedding module 208A, in conjunction with the processor 204, can perform machine learning embedding process to learn the embeddings.

The embedding module 208A, in conjunction with the processor 204, can determine the node embeddings using a static node embedding method. For example, the embedding module 208A, in conjunction with the processor 204, can utilize a static node embedding method that includes a random-walk-based method as performed in, for example, DeepWalk and node2vec. For example, the node2vec framework learns low-dimensional representations for nodes in a graph by optimizing a neighborhood preserving objective. The objective is flexible, and the algorithm accommodates for various definitions of network neighborhoods by simulating biased random walks. Specifically, it provides a way of balancing the exploration-exploitation tradeoff that in turn leads to representations obeying a spectrum of equivalences from homophily to structural equivalence.

The embedding module 208A, in conjunction with the processor 204, can determine the edge embeddings using a static edge embedding method. For example, the embedding module 208A, in conjunction with the processor 204, can utilize a modified version of edge2vec. The modified edge learning process can aim to optimize a loss function that takes into account the global edge proximity, the local edge proximity, and the all-time edge proximity. The modified edge learning process will be described in further detail herein.

The embedding module 208A, in conjunction with the processor 204, can determine the subgraph embeddings using a subgraph representation learning method. For example, the embedding module 208A, in conjunction with the processor 204, can determine a subgraph embedding for a subgraph based on the subgraph of the graph, times in the time period, node embeddings for nodes in the subgraph, edge embeddings for edges in the subgraph, node periodicity classifications for the nodes in the subgraph, and edge periodicity classifications for the edges in the subgraph. The embedding module 208A, in conjunction with the processor 204, can determine the subgraph embeddings using a modified SubGNN process, as described in further detail herein.

The graph translation module 208B may comprise code or software, executable by the processor 204, for translating a plurality of embeddings from a plurality of time stamps into projected embeddings. The graph translation module 208B, in conjunction with the processor 204, can perform embedding projection using a machine learning process that optimizes a loss function to obtain transition matrices to translate the input embeddings to obtain embeddings that are close to the embeddings at the final time stamp. As such, the graph translation module 208B, in conjunction with the processor 204, can project input embeddings from each time stamp to a single time stamp's (selected to be the final timestamp) embedding space. By doing so, the graph translation module 208B, in conjunction with the processor 204, can create a space in which each projected embedding can be accurately compared with one another.

The embedding aggregation module 208C may comprise code or software, executable by the processor 204, for aggregating a plurality of projected embeddings. The embedding aggregation module 208C, in conjunction with the processor 204, can determine an aggregated embedding based on the plurality of projected embeddings. As such, the embedding aggregation module 208C, in conjunction with the processor 204, can combine the plurality of projected embeddings, where each projected embedding is for a different time stamp, into a single aggregated embedding. The aggregated embedding can represent the edge, node, or subgraph (e.g., entity) for which the projected embeddings represent.

For example, the embedding aggregation module 208C, in conjunction with the processor 204, can utilize a recurrent neural network to aggregate the embeddings of a given node or edge across time. The embedding aggregation module 208C, in conjunction with the processor 204, can learn an embedding matrix and a transition matrix using the recurrent neural network. The embedding matrix can convert the node or edge projected embeddings to a smaller dimension. The transition matrix can aid in transforming the projected embeddings into a single aggregated embedding.

The periodicity detection module 208D may comprise code or software, executable by the processor 204, for determining whether or not a node or edge is periodic. The periodicity detection module 208D, in conjunction with the processor 204, can perform a binary periodicity classification using a classification and regression task. The periodicity detection module 208D, in conjunction with the processor 204, can determine a node periodicity classification for each input aggregated node embedding and an edge periodicity classification for each input aggregated edge embedding. For example, the periodicity detection module 208D, in conjunction with the processor 204, can perform a machine learning classification method to determine whether or not the node or edge is periodic.

The network interface 206 may include an interface that can allow the data analysis computer 200 to communicate with external computers. The network interface 206 may enable the data analysis computer 200 to communicate data to and from another device (e.g., a database, a processing computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
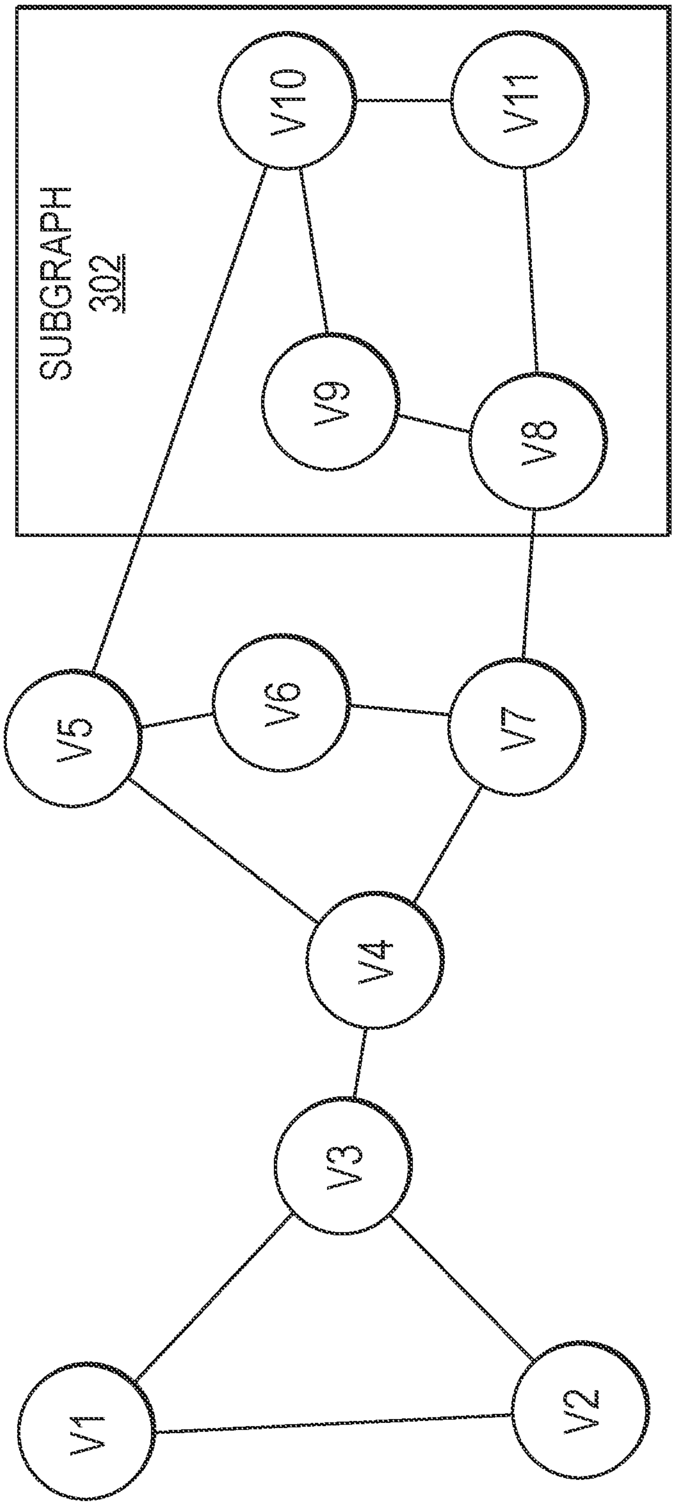
FIG. 3 shows a graph data illustrated as a collection of nodes and edges according to embodiments.

FIG. 3 shows a graph data illustrated as a collection of nodes and edges according to embodiments. FIG. 3 illustrates nodes V1-V11 connected by a number of edges. FIG. 3 also illustrates a subgraph 302 that includes nodes V8-V11. A graph can include any number of nodes and edges. Further, a graph can include none, one, or a plurality of subgraphs. A subgraph can include nodes and edges that relate to one another. For example, the subgraph 302 can include nodes V8-V11 that have similar characteristics (e.g., location, usage history, preferences, etc.).

Figure 4:
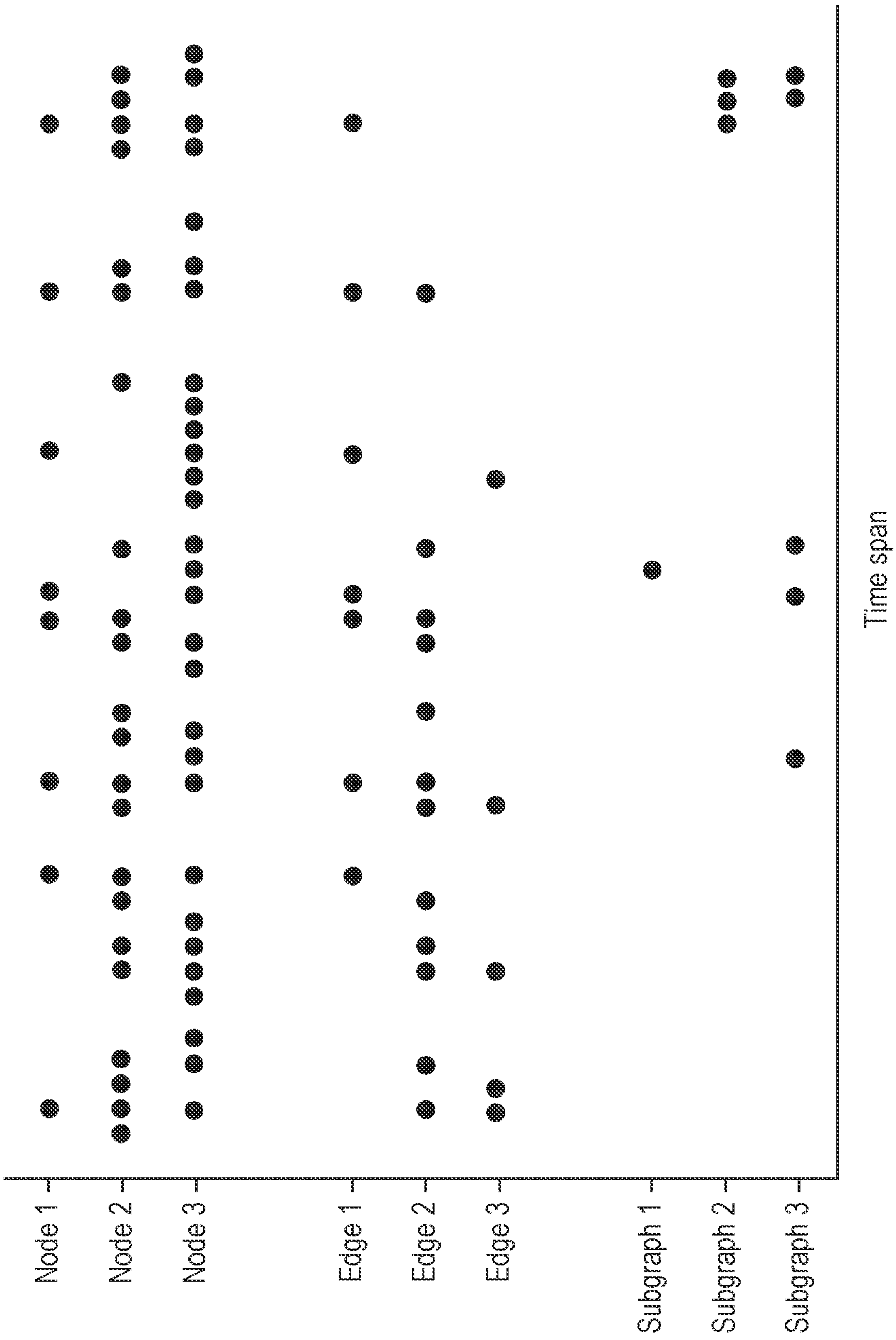
FIG. 4 shows example node, edge, and subgraph occurrences over time according to embodiments.

Compared to nodes and edges, the occurrences of subgraphs in dynamic graphs' time spans are significantly sparser. In a given a limited window, it may be feasible to have enough observations to determine the periodicity of nodes and edges, yet be infeasible to determine the periodicity of subgraphs. For example, take the Enron email dataset. FIG. 4 shows the selected nodes', edges' and subgraphs' occurrences between t=400 and t=450. As can be seen, both nodes and edges exhibit easily observable periodical patterns for each entity, although their underlying periodicity vary. However, the subgraphs have fewer occurrences during this window, hence making it hard to determine whether they are periodical given the limited window. To address such sparsity, one way to amend is to first construct periodicity-aware features from nodes and edges, then leverage this learned information to facilitate the understanding of the subgraphs' periodicity. Nonetheless, this approach cannot be done with any current methods, which leads to a second technical challenge.

Although leveraging the learned node and edge features to further construct subgraph embeddings that can ease the subgraph periodicity detection appears to be good strategy on a high-level, the approach itself requires many detailed considerations. To start, while there has been abundant node representation learning algorithms that generate high-quality node embeddings [10]-[18], the same cannot be said for edge embeddings [19]-[21], not to mention the even more limited development in subgraph embeddings [22], [23]. To precisely capture a set of periodicity-aware subgraph embeddings in the dynamic graphs, being able to obtain high-quality edge and subgraph embeddings is needed.

To address the above technical problems in learning the periodicity of subgraphs from a representation learning approach, embodiments provide for a hierarchical system that first learns periodicity-aware embeddings of nodes and edges, then further leverages this information to learn the subgraph embeddings that are optimal for subgraph periodicity detection. For example, a system according to embodiments can first learn static snapshots of dynamic graphs' node and edge embeddings separately, where embodiments improve an existing edge embedding method [21] to enhance its embedding quality in downstream periodicity detection task. The learned embeddings are then projected onto the same latent space with an embedding translation method [24] and aggregated throughout the dynamic graph's time span with a recurrent neural network to a single embedding. The predicted periodicity scores are then sent to the subgraph embedding stage, where each subgraph is decomposed into a node graph and an edge graph. Using the previously learned node and edge embeddings, combined with the periodicity scores, embodiments can utilize a message-passing-based subgraph embedding method [22] to generate each snapshot's subgraph embeddings. The subgraph embeddings are then also projected onto the same space across time span, aggregated with a recurrent neural network, and finally passed to a fully connected layer to predict the underlying periodicity.

As such, embodiments described herein provide for the following technical solutions and advantages to the aforementioned technical problems. 1) Embodiments provide for determining the periodicity of subgraphs in dynamic graphs from a hierarchical and neural-network-based approach. 2) Embodiments provide a modified version of edge representation learning method by introducing a new loss function that captures the presence of edges at a given time stamp. As such, the edge embeddings are more fitting for predicting the edge periodicity through the dynamic graphs' time span. 3) Embodiments utilize the learned periodicity-aware node and edge embeddings and their periodicity scores into the recently proposed subgraph embedding method, SubGNN [22]. Through evaluation on two real-world datasets, it can be shown that the learned periodicity-aware subgraph embeddings can better detect the subgraphs' periodicity compared to the non-periodicity-aware embeddings.

Embodiments can define a dynamic graph as $\mathcal{G}=(\mathcal{V},\mathcal{E},\mathcal{T})$, where $\mathcal{V}=\{V(t)\}_{t\in\mathcal{T}}$ is a collection of node sets over time, $\mathcal{E}=\{E(t)\}_{t\in\mathcal{T}}$ is a collection of edge sets over time, and $\mathcal{T}$ is the complete time span of the dynamic graph $\mathcal{G}$. A subgraph at time t can be defined as $\mathcal{S}(t)=(V(t)', E(t)')$, where $V(t)'\subseteq V(t)$ and $E(t)'\subseteq E(t)$. Then given a dynamic graph $\mathcal{G}$, and a set of subgraphs $\mathcal{S}(t)=\{S(t)\}_{t\in\mathcal{T}}$, embodiments aim to learn the periodicity-aware embeddings of nodes, edges, and subgraphs, and further leverage the embeddings to predict the underlying periodicity of each entity.

As a first example, the nodes of the dynamic graph can represent users and resource providers. The edges of the dynamic graph can represent interactions (e.g., transactions, etc.) between the users and resource providers. A subgraph of the dynamic graph can include a collection of users, resource providers, and interactions that relate to one another in some manner. The subgraph can represent, for example, interactions that take place during and related to a small town's local festival. The subgraph may only appear in the dynamic graph at particular times. Embodiments can determine whether or not the subgraph is periodic. For example, the subgraph can be periodic if the local festival occurs once a month when the collection of nodes and edges of the subgraph appear in the dynamic graph. As such, embodiments can determine that the small town's local festival both exists and takes place monthly based on dynamic graph.

As a second example, the nodes of the dynamic graph can represent computers in a computer network. The edges of the dynamic graph can represent communication channels or linkages between the computers in the computer network. A subgraph of the dynamic graph can represent, for example, a grouping of computers that process actions for a massively multiplayer online game (MMO) on behalf of player computers and game server computers. The subgraph may appear periodically based on players using the computers playing the MMO with one another. Large groups of players playing the MMO together can impact network traffic and the load of the game server computers. Embodiments can determine whether or not the subgraph is periodic. For example, the subgraph can be periodic if the large group of players that play the MMO together appears in the subgraph at somewhat regular intervals (e.g., appears on weekends, appears on Tuesday nights, appears on the second Thursday of each month, etc.). As such, embodiments can determine the periodicity of the subgraph and allow computers in the network to prepare for network load balancing and/or other processes that limit overloading the game server computers during the high usage times when the subgraphs appear.

In some embodiments, input data used by a computer to predict the underlying periodicity of each entity (e.g., that is represented by a node) can be prepared along with training labels for system training. Any known periodicity labels can be utilized by the system. For example, the system can utilize prior knowledge of the periodicity of nodes and edges in order to properly learn the periodicity-aware embeddings of each type of entities. For periodicity label generation, to obtain the ground truth of node and edge periodicity, embodiments can leverage the approach of event periodicity mining that can handle a portion of missing data proposed in [8]. Given the complete time span $\mathcal{T}$ of a dynamic graph $\mathcal{G}$, the computer can construct an occurrence vector of length $\mathcal{T}$, where each value is either 0 or 1, representing whether at that time stamp the corresponding entity (e.g., represented by a node) is present. Through an interval cutting and overlapping approach, the method in [8] then outputs a probability score of each tested periodicity value.

In some embodiments, a subgraph of interest can be provided to the computer prior to determining the subgraph periodicity. For subgraph pattern mining there has been several approaches proposed regarding mining frequently appearing subgraph patterns across dynamic graphs. Embodiments can utilize any suitable subgraph pattern mining process to determine one or more subgraphs from a dynamic graph, such as, gSpan [28].

Figure 5:
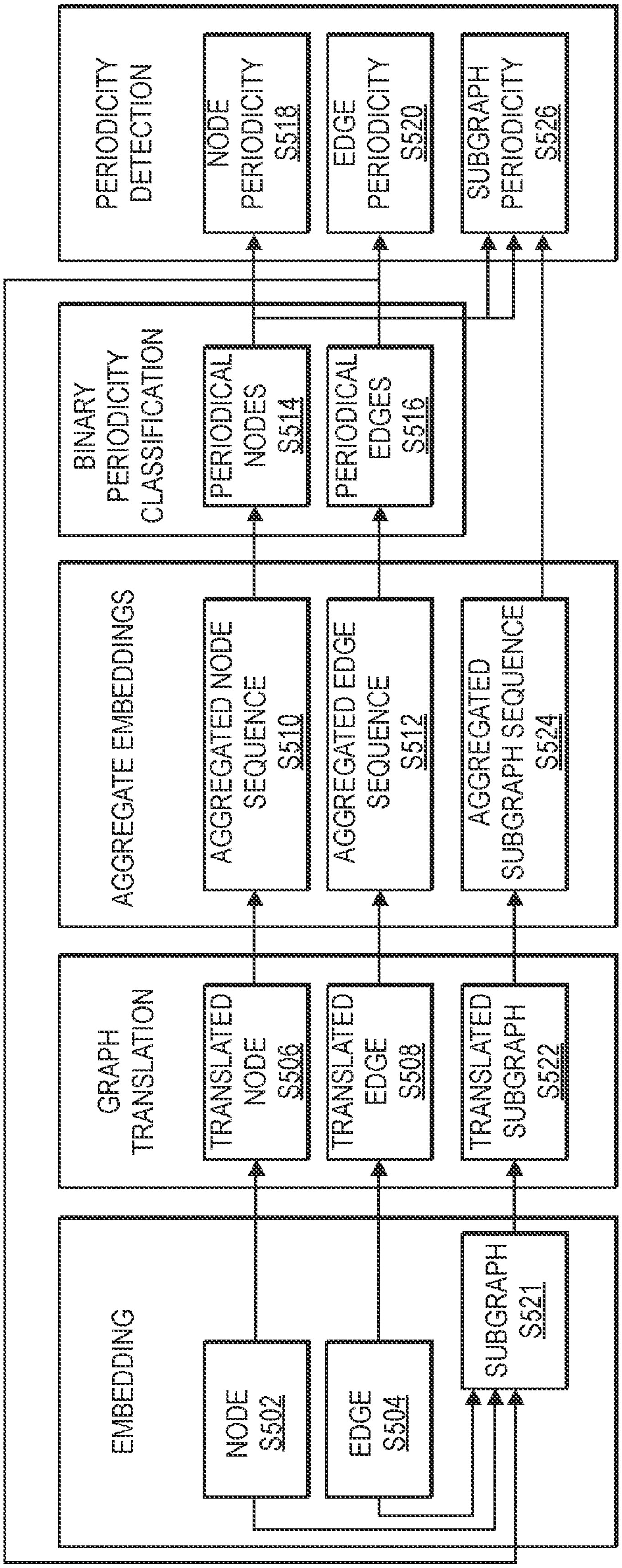
FIG. 5 shows a flow diagram illustrating an overall architecture of a hierarchical periodicity detection system according to embodiments.

FIG. 5 shows a flow diagram illustrating an overall architecture of a hierarchical periodicity detection system according to embodiments. The method of FIG. 5 can be performed by a computer (e.g., a data analysis computer). Algorithm 1, which is described below, includes pseudocode to perform the process of FIGS. 5 and 6.

Referring to FIG. 5, a method can be described in a case where the computer is a data analysis computer, the graph is a dynamic graph, the nodes in the plurality of nodes in the graph represent resources providers and users, and the edges in the plurality of edges in the graph represent interactions between the resource providers and the users. However, it is understood that the method can be applied to other use cases.

Before describing the individual steps illustrated in FIG. 5, a brief overview of the method will be discussed. At the beginning of the pipeline, according to embodiments, a computer can first obtain the node and edge embeddings of each static snapshot of the dynamic graph with graph embedding methods such as node2vec [15] and edge2vec [21]. The obtained node and edge embeddings can be defined as $\mathcal{X}_{\mathcal{V}}=\{X_V(t)\}_{t\in\mathcal{T}}$ and $\mathcal{X}_{\mathcal{E}}=\{X_e(t)\}_{t\in\mathcal{T}}$ respectively.

The obtained $X_V$ and $X_e$ are then passed into an embedding projection method (e.g., MUSE [24]), where all the snapshots' embeddings during t=1 . . . 1 are projected to t= $\mathcal{T}$. The projected embeddings are denoted as $$\mathcal{X}_{\mathcal{V}}^{*} \text{ and } \mathcal{X}_{\mathcal{E}}^{*}.$$

The projected embeddings are then fed into a recurrent neural network to aggregate each node and edge's sequence of embeddings throughout the time span $\mathcal{T}$. The aggregated embedding of a node v is denoted as $h_v$ and the aggregated embedding of an edge e is denoted as $h_e$.

The aggregated embeddings are then used to conduct the first prediction task, the binary periodicity classification. The classified results are then sent to two modules: the periodicity detection module and the subgraph embedding generation module. The periodicity detection module is similar to the binary classification module, where the usage of the classified results in the subgraph embedding generation module serves as an embedding amplifier on the nodes or edges that are determined as periodical.

After the above embeddings and information are in place, embodiments can then generate the embeddings of each pre-determined subgraph for each static snapshot in the dynamic graph with subgraph embedding method (e.g., SubGNN [22]). The rest of the steps leading up to detecting the periodicity is then similar to the ones for nodes and edges, except the part where embodiments do not classify the subgraphs into periodical or non-periodical classifications. Rather, embodiments incorporate a periodicity filter mask to facilitate the detection of the underlying periodicity of the subgraphs.

Returning to FIG. 5, at step S502, the computer can determine a plurality of node embeddings for a plurality of nodes. For example, for each time step of a plurality of time steps, the computer can determine the plurality of node embeddings for that time step, where the plurality of node embeddings correspond to nodes in the graph at a single time step. The plurality of nodes and the plurality of edges form a graph.

To embed each snapshot's node embeddings, various node embedding methods can be used. There are several graph representation learning algorithms proposed that are able to generate high quality node embeddings that are useful for various downstream tasks, including methods for static graphs [10]-[15] and dynamic graphs [16]-[18]. The dynamic graph embedding approaches in general suffer from high complexity and tend to carry over the presence of nodes across times, whereas differentiating between whether a node is present in a specific time stamp or not is crucial in the periodicity detection task [25]. Therefore, embodiments utilize a static approach to obtain node embeddings, contrary to a general assumed use of a dynamic graph embedding. As such, the computer can determine the node embeddings for the plurality of nodes using a static node embedding process including a random walk sampling during a machine learning process. In addition, in order to accurately capture the presence of nodes, random-walk-based methods such as DeepWalk [13] and node2vec [15] are more suitable than the ones without random walks. This is because the non-present nodes are not reached by random walks unless it is sampled at the random start step.

To conduct a first-order random walk at a given snapshot t of the dynamic graph, the transition probability of the random walks can be expressed as follows:

$$P(c_i = x \mid c_{i-1} = v) = \begin{cases} \frac{\pi_{vx}}{Z}, & \text{if } (v, x) \in E(t) \\ 0, & \text{otherwise} \end{cases}$$

where $c_i$ is the node reached at the i-th step of the walk, $\pi_{vx}$ is the transition probability from node v to x, and Z is a normalizing constant.

As node2vec encounters the BFS and DFS strategies when conducting random walks, the p and q parameters that help to control the bias towards BFS and DFS can be incorporated into the unnormalized transition probability for the second-order random walk as $$\pi_{vx} = \alpha_{pq}(t, x) \cdot w_{vx} \tag{1}$$

where $w_{vx}$ is the weight of the edge (v, x). The $\alpha_{pq}(t, x)$ is a biased term formulated as $$\alpha_{pq}(t, x) = \begin{cases} \frac{1}{p}, & \text{if } d_{tx} = 0 \\ 1, & \text{if } d_{tx} = 1 \\ \frac{1}{q}, & \text{if } d_{tx} = 2 \end{cases}$$

where $d_{tx}$ denotes the length of the shortest path between t and x.

The sampled walks are used as inputs to a skipgram-like model to then obtain embeddings for each node at time stamp t [26], which are denoted as $X_v(t)$.

At step S504, the computer can determine a plurality of edge embeddings for a plurality of edges. For example, for each time step of the plurality of time steps, the computer can determine the plurality of edge embeddings for that time step, where the plurality of edge embeddings correspond to edges in the graph at a single time step. In some embodiments, the computer can utilize a modified version of edge2vec [21], to embed each snapshot's edge embeddings. The computer can determine the edge embeddings for the plurality of edges based on training a machine learning model that optimizes a loss function that takes into account global edge proximity, local edge proximity, and all-time edge proximity.

Given two edges, $e_1=(s_1, t_1)$ and $e_2=(s_2, t_2)$, the two edges have local edge proximity of 1 if either $s_1=s_2$ or $t_1=t_2$. Otherwise, the local proximity is 0. Their global edge proximity is defined by the similarity of their neighborhood vectors, which is defined as follows.

$$n_e = (w_{s1}, \ldots, W_{s|V|}, w_{t1}, \ldots, w_{t|V|}) \tag{2}$$

where $w_{ij}$ denote the connection between vertices i and j, which can be directly retrieved from the graph's adjacency matrix.

1) Global Edge Proximity: The edge2vec algorithm aims to preserve the global proximity of edges through optimizing the deep autoencoders. For each input in an autoencoder, a neighborhood vector $n_e$ is fed in and denoted as $$x_e^{(0)}.$$

For each layer n in the encoder, its input is the output from the previous layer after passing through a fully connected layer:

$$x_e^{(n)} = \sigma(W^{(n)} x_e^{(n-1)} + b^{(n)}) \tag{3}$$

The decoder works in a symmetrical way, where the inputs of each layer n−1 of the decoder is the output of the previous layer n (decoder's layers are numbered decreasingly) after passing through a fully connect layer:

$$y_e^{(n-1)} = \sigma\left(M^{(n)} y_e^{(n)} + d^{(n)}\right) \tag{4}$$

For the autoencoder to be well trained, it should have as little difference as possible between the input at the beginning $$x_e^{(0)}$$

and the final output of the decoder $$y_e^{(0)}.$$

This leads to the first loss to the first loss to optimize, global loss.

$$\mathcal{L}_{global} = \left\|\left(y_e^{(0)} - x_e^{(0)}\right) \circ I_e\right\|_2^2 \tag{5}$$

where $I_e$ is an indicator vector for $$x_e^{(0)}.$$

Let $$I_e = \{I_{e,i}\}_{i=1}^{2|V|},\ x_e^{(0)} = \{x_{e,i}^{(0)}\}_{i=1}^{2|V|},$$

and the value of the indicator vectors can be determined as:

$$I_{e,i} = \begin{cases} p, & \text{if } x_{e,i}^{(0)} > 0 \\ 0, & \text{otherwise} \end{cases}$$

2) Local Edge Proximity: To preserve the local proximity of edges, edge2vec aims to pull embeddings of edges with local proximity closer, while push embeddings of edges with no local proximity further apart. To achieve this, edge2vec borrows the idea of skipgram from word2vec [26]. For each given edge pair ep=(e, e') (e and e' both have local proximity of 1), it draws λ negative edges whose local proximity with e and e' are both 0. The local proximity loss of a given edge pair is thus $$\mathcal{L}_{local}(ep, \Theta) = -\log \sigma\left(x_e^{(N)} \cdot x_{e'}^{(N)}\right) \tag{6}$$

$$-\sum_{i=1}^{\lambda} \left(\log \sigma\left(-x_e^{(N)} \cdot x_{ei}^{(N)}\right)\right) \tag{7}$$

The loss functions considered by the original edge2vec end here. However, so far the similarity and dissimilarity between edges only considered within a single snapshot of the overall dynamic graphs. In order the achieve the differentiation of edges across time, embodiments further provide for an additional loss function to consider.

3) All-time Edge Proximity: To differentiate between whether an edge exists in a given time t in the dynamic graph or not, embodiments introduce an all-time edge proximity. The all-time edge proximity is a modification based on $\mathcal{L}_{local}$, where instead of having non-local-proximity edges as negative samples, the computer samples the ones that do not exist in the given time t but do exist in other times t'. In this way, the all-time edge proximity loss can be written as follows.

$$\mathcal{L}_{all\text{-}time}(ep, \Theta) = -\log \sigma\left(x_e^{(N)} \cdot x_{e''}^{(N)}\right) \tag{8}$$

$$-\sum_{j=1}^{\lambda} \left(\log \sigma\left(-x_e^{(N)} \cdot x_{ej}^{(N)}\right)\right) \tag{9}$$

where e" is an edge that is also present at time t (but is not necessary to have local proximity with e), and $e_j$ is a negative edge that does not exist in time t.

To this end, embodiments introduce the three losses the modified edge embedding process that for example, edge2vec, aims to optimize. The overall objective of the modified edge2vec is therefore added together a follows.

$$\mathcal{L}(ep, \Theta) = \alpha \sum_{c \in ep} \mathcal{L}_{global}(c, \Theta) \tag{10}$$

$$+\beta\mathcal{L}\text{ local }(ep, \Theta) \tag{11}$$

$$+\gamma\mathcal{L}_{all\text{-}time}(ep, \Theta) \tag{12}$$

The finally obtained edge embedding at each timestamp t is then denoted as $X_e(t)$.

At step S506, the computer can translate each node embedding of the plurality of node embeddings for each time of the time period into projected node embeddings. For example, the plurality of node embeddings can be normalized across each time step. Additionally, at step S508, the computer can translate each edge embedding of the plurality of edge node embeddings for each time of the time period into projected edge embedding. By translating each node embedding and edge embedding into a similar node embedding space and edge embedding space, respectively, the embeddings can be more accurately compared to one another.

As an example of translating embeddings, translating a node embedding will be discussed. It is understood that translating each node embedding into projected node embeddings is performed in a similar manner to translating each edge embedding into projected edge embeddings. For example, for each time stamp t's node embeddings $X_v(t)$ and edge embeddings $X_e(t)$ (where $t \neq \mathcal{T}$), the computer can learn transition matrices $W_v^{t\to\mathcal{T}}$ and $W_e^{t\to\mathcal{T}}$ such that the projected embeddings are close to the embeddings at the final time stamp $\mathcal{T}$ (e.g., $X_v(\mathcal{T})$ and $X_e(\mathcal{T})$).

More specifically, a discriminator for projecting embeddings from t to $\mathcal{T}$ is trained to differentiate between the embeddings sampled from and $X_*(\mathcal{T})$ and $W_*^{t\to\mathcal{T}}$. Formally, the discriminator's loss function can be written as follows.

$$\mathcal{L}_D^t\left(\theta_D^t \middle| W^{t\to\mathcal{T}}\right) = -\frac{1}{n}\sum_{i=1}^{n} \log P_{\theta_D}\left(t \middle| W_*^{t\to\mathcal{T}}\right) \tag{13}$$

$$-\frac{1}{m}\sum_{i=1}^{m} \log P_{\theta_D}(\mathcal{T} | y_i) \tag{14}$$

By minimizing the loss above, the computer is able to leverage the obtained $W_v^{t\to\mathcal{T}}$ and $W_e^{t\to\mathcal{T}}$ and get the final projected embeddings of nodes and edges across time as $$\mathcal{X}_{\mathcal{V}}^* \text{ and } \mathcal{X}_{\mathcal{E}}^*.$$

At step S510, for each node in the plurality of nodes, the computer can aggregate the projected node embeddings for a particular node into an aggregated node embedding. The aggregated node embedding can represent a node for all time steps of the plurality of time steps. Additionally, at step S512, for each edge in the plurality of edges, the computer can aggregate the projected edge embeddings into an aggregated edge embedding. The aggregated edge embedding can represent an edge for all time steps of the plurality of time steps.

In some embodiments, the computer can perform steps S510 and S512 after steps S502 and S504, respectively. For example, after determining the node embeddings, the computer can aggregate the plurality of node embeddings or derivatives thereof into an aggregated node embedding. The derivatives of the plurality of node embeddings can be the plurality of projected node embeddings. Additionally, after determining the edge embeddings, the computer can aggregate the plurality of edge embeddings or derivatives thereof into an aggregated edge embedding. The derivatives of the plurality of edge embeddings can be the plurality of projected edge embeddings.

As an example of aggregating projected embeddings, aggregating projected node embeddings will be discussed. It is understood that aggregating each projected node embedding into an aggregated node embedding is performed in a similar manner to aggregating each edge embedding into an aggregated edge embedding. So far, the computer has generated node and edge embeddings across the time span of the dynamic graph $\mathcal{G}$, and projected them to the same embedding space as the last time stamp (e.g., t=$\mathcal{T}$). To aggregate the embeddings of a given entity across time, the computer can feed the sequence of embeddings into a recurrent neural network, where a node/edge embedding at time t is an aggregation from its embeddings during 1 . . . t−1, as described below.

$$h_t = \sigma_h(W_h x_t + U_h h_{t-1} + b_h) \tag{15}$$

where $W_h$ is the embedding matrix that converts a given node/edge embedding to smaller dimension, and $U_h$ is a transition matrix to from t−1 to t.

As such, aggregating the projected node embeddings and aggregating the projected edge embeddings includes inputting the projected node embeddings into a first recurrent neural network to aggregate each node sequence of embeddings throughout the time period and inputting the projected edge embeddings into a second recurrent neural network to aggregate each edge sequence of embeddings throughout the time period. The first recurrent neural network and the second recurrent neural network can be executed according to equation 15 to determine the embedding matrix and the transition matrix. The computer can perform a machine learning process to determine (e.g., learn) the embedding matrix and the transition matrix for both the first recurrent neural network and the second recurrent neural network. The computer can then obtain the aggregated node embeddings and the aggregated edge embeddings using the learned embedding matrices and transition matrices.

After the aggregation, the computer holds (e.g., stores in memory) the aggregated node and edge embeddings, denoted as $h_v$ and $h_e$, respectively.

At step S514, for each node in the plurality of nodes, the computer can classify the aggregated node embedding as being periodic or not periodic to produce node periodicity classifications. Additionally, at step S516, for each edge in the plurality of edges, the computer can classify the aggregated edge embedding as being periodic or not periodic to produce edge periodicity classifications. The computer can classify the aggregated node embeddings and the aggregated edge embeddings using a binary machine learning classification method. The binary machine learning classification method can label the input aggregated node embeddings and the input aggregated edge embeddings as being "periodic" or as being "not periodic."

As an example of classifying aggregated node embeddings, classifying an aggregated node embedding will be discussed. It is understood that classifying each aggregated node embedding is performed in a similar manner to classifying each aggregated edge embedding. For example, with the aggregated node embeddings $h_v$ and the aggregated edge embeddings $h_e$, binary periodicity classification and numerical periodicity detection are be performed, by the computer, as a classification and regression task. For example, the computer can classify the aggregated node embeddings and the aggregated edge embeddings as follows:

$$y_t = \sigma_y(W_y h_t + b_y) \tag{16}$$

where for both the binary periodicity classification and numerical periodicity detection tasks, the dimensions of $y_t$ are set to 1. The output of the binary classification task can be denoted as $p_v$ and $p_e$, and leverage them for further representation learning of subgraphs, which we will discuss next.

At step S518, the computer can output node periodicity determinations based on the node periodicity classifications determined at step S514.

At step S520, the computer can output edge periodicity determinations based on the edge periodicity classifications determined at step S516.

At step S521, after obtaining the node embeddings and the node periodicity classifications for the plurality of nodes in the graph, and the edge embeddings and the edge periodicity classifications for the plurality of edges in the graph for each time of the time period, the computer can determine subgraph embeddings.

Figure 6:
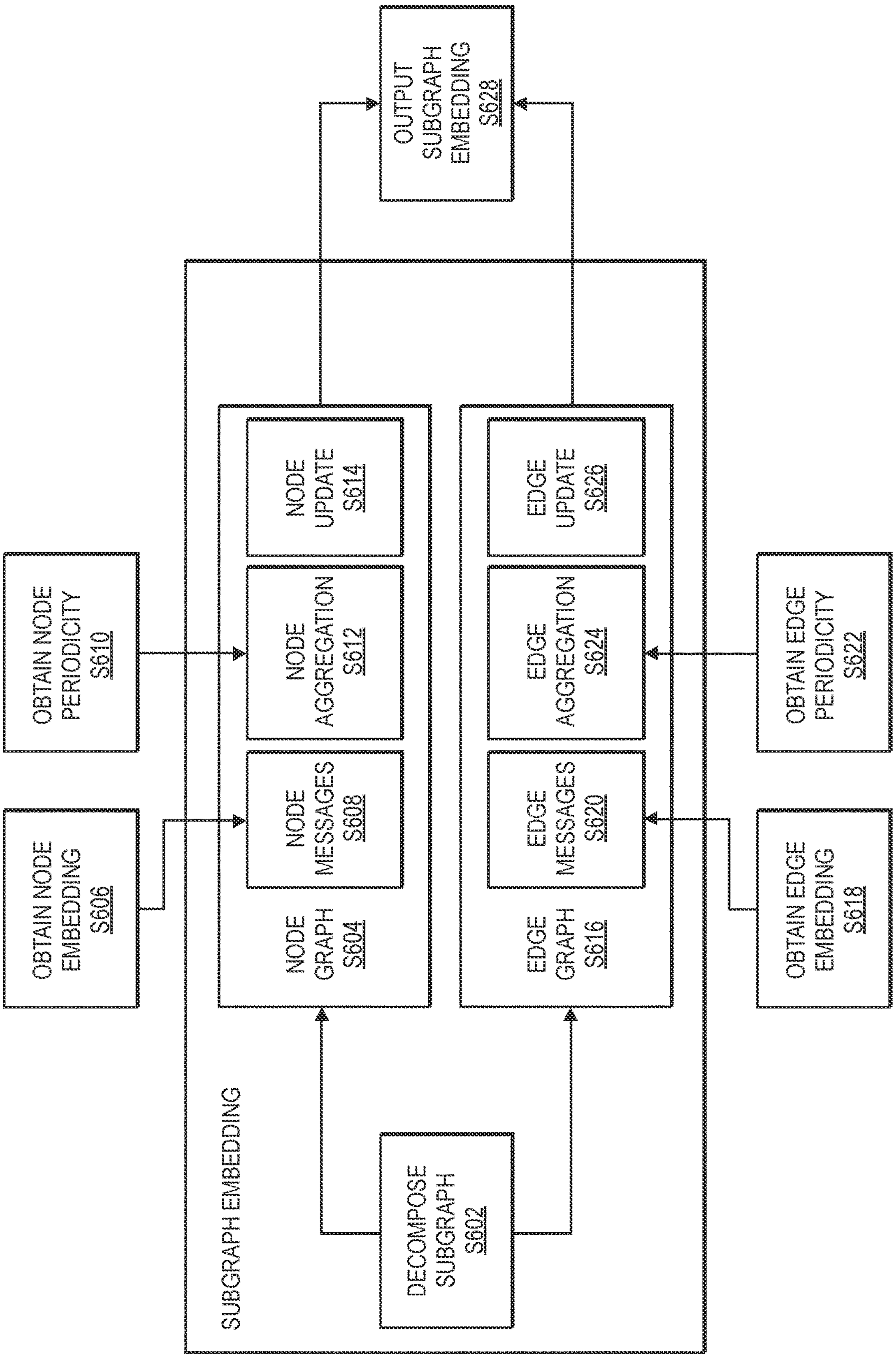
FIG. 6 shows a flow diagram illustrating a process of generating periodicity-aware subgraph embeddings according to embodiments.

The computer can determine the subgraph embeddings based on a subgraph of the graph and based on times in the period (e.g., time steps), and the node embeddings for the nodes of the subgraph, and the edge embeddings for the edges of the subgraph, the node periodicity classifications for the nodes of the subgraph, and the edge periodicity classifications for the edges of the subgraph. The computer can determine a subgraph embedding for the subgraph at each time stamp. FIG. 6 illustrates a subgraph embedding determination method and will be described in further detail below.

At step S522, after determining the subgraph embeddings, the computer can translate each subgraph embedding of the subgraph embeddings for each time of the time period into projected subgraph embeddings of a plurality of projected subgraph embeddings. The subgraphs embeddings can be projected into subgraph embeddings similar to the node embeddings being projected into node embeddings, described at step S506.

For example, the computer can project each subgraph embedding, representing the subgraph at each timestamp, of the subgraph embeddings into a same coherent space. The computer can project each subgraph embedding into an embedding space of the last timestamp's subgraph embedding. The projection can be performed using a machine learning process to learn transition matrices, as described in further detail herein.

At step S524, after translating each subgraph embedding, the computer can aggregate, for the subgraph, the plurality of projected subgraph embeddings into an aggregated subgraph embedding. The aggregated subgraph embedding can represent the subgraph for all time steps. The plurality of projected subgraph embeddings embedding can be aggregated into an aggregated subgraph embedding in a similar manner to the plurality of projected node embeddings being aggregated into an aggregated node embedding, described at step S510. For example, the aggregation can be performed using a recurrent neural network to learn an embedding matrix and a transition matrix, as described herein.

In some embodiments, the computer can perform step S524 after step S521. For example, after determining the subgraph embeddings, the computer can aggregate the plurality of subgraph embeddings or derivatives thereof into an aggregated subgraph embedding. The derivatives of the plurality of subgraph embeddings can be the plurality of projected subgraph embeddings.

At step S526, after determining the aggregated subgraph embedding, the computer can determine if the subgraph is periodic based upon aggregated subgraph embedding, the node periodicity classifications, and the edge periodicity classifications. For example, the computer can pass the aggregated subgraph embedding into a fully connected recurrent neural network layer to predict the underlying periodicity of the subgraph. The recurrent neural network can be trained to identify whether or not an aggregated subgraph embedding is "periodic" or "not periodic" based on the node periodicity classifications and the edge periodicity classifications.

In some embodiments, determining if the subgraph is periodic can include the computer determining an estimated periodicity score based upon at least the aggregated subgraph embedding. The computer can then determine whether or not the estimated periodicity score exceeds a periodicity score threshold. The periodicity score threshold can be a predetermined value. If the estimated periodicity score exceeds the periodicity score threshold, the computer can output an indication that the subgraph is periodic. In some cases, the computer can output the estimated periodicity score. For example, the computer can determine an estimated periodicity score of 0.9 (on a scale of 0 to 1). The computer can compare the estimated periodicity score of 0.9 to a periodicity score threshold of 0.85. Since the estimated periodicity score of 0.9 exceeds the periodicity score threshold of 0.85, the computer can output an indication that the subgraph associated with the estimated periodicity score is periodic.

FIG. 6 shows a flow diagram illustrating a process of generating periodicity-aware subgraph embeddings according to embodiments. The process illustrated in FIG. 6 can be performed at step S521 in FIG. 5.

There have been several proposals regarding the learning of subgraphs' representations. To incorporate the learned embedding and periodicity of nodes and edges from the steps above, some embodiments can utilize a modified SubGNN [22]. SubGNN is designed on top of a message passing framework [27], which makes it easy to consider nodes' and edges' embeddings as well as periodicity information.

Prior to step S602, a computer can determine a subgraph S of a dynamic graph. The computer can determine a plurality of subgraphs using subgraph pattern mining learning process and then selecting the subgraph from the plurality of subgraphs. The computer can select a subgraph of interest from the plurality of subgraphs included in the dynamic graph.

At step S602, the computer can decompose the subgraph S into a sub-node graph $$S'_v$$

and a sub-edge graph $$S'_e.$$

The sub-node graph $$S'_v$$

can include information about the nodes of the subgraph S. The sub-edge graph $$S'_e$$

can include information about the edges of the subgraph S.

At step S604, after obtaining the sub-node graph $$S'_v,$$

the computer can process the sub-node graph $$S'_v$$

during steps S606-S614.

At step S606, the computer can obtain node embeddings for the plurality of nodes in the subgraph S as included in the sub-node graph $$S'_v.$$

The node embeddings can be created, for example, at step S502 as illustrated in FIG. 5.

At step S608, the computer can determine node messages. The node messages can be data items that are created based on the node embeddings (determined at step S502 in FIG. 5). The node messages can provide information from the node embeddings to the nodes that are included in the sub-node graph. For example, an anchor patch that includes one or more anchor nodes can be determined by the computer. The node embeddings of the nodes included in the anchor patch can be used to modify (e.g., pass a message including data to) the nodes of the sub-node graph. The computer can determine a plurality of node messages from anchor nodes in the subgraph using the node embeddings.

As an example, for the sub-node graph $$S_v',$$

the computer can identify anchor patches of the subgraph S following the channels proposed in [22] and pass the message from anchor patches to the given subgraph as follows.

$$MSG_X^{A \to S_v'} = \gamma X\left(S^{(c)}, A_X\right) \cdot a_X \tag{17}$$

where X is the channel, A is the corresponding anchor patch, and $a_X$ is the encoding of the anchor patch, which can be directly retrieved from the previously learned and projected node embeddings.

At step S610, the computer can obtain node periodicity classifications for the plurality of nodes included in the sub-node graph $$S_v'.$$

The node periodicity classifications can be generated at step S514 as illustrated in FIG. 5.

At step S612, the computer can determine aggregated messages using the determined node messages and the sub-node graph. The node messages can be determined using an order-invariant aggregation function (AGG). Furthermore, the node message for a particular node can be weighted by the node's periodicity (e.g., as determined at step S514 as illustrated in FIG. 5).

The computer can then aggregate the messages weighted by the node periodicity classifications as follows.

$$g_{X,c} = AGG_M\left(\left\{p_v^A \cdot MSG_X^{A_X \to S_v'}\right\}\right) \tag{18}$$

where AGG is an order-invariant aggregation function and $$p_v^A$$

is the periodicity of the anchor patch A based on the previously obtained $p_v$.

At step S614, the computer can generate embeddings for the nodes in the sub-node graph. For example, the computer can create subgraph-node embeddings based on the aggregated messages.

Steps S616-S626 are similar to steps S604-S614, but are performed with the edge subgraph and the associated edge data rather than the node subgraph and the associated node data, and will not be repeated here.

At step S628, the computer can combine the subgraph-node embeddings and the subgraph-edge embeddings determined at steps S614 and S626. For example, the computer can determine an overall subgraph embedding using the subgraph-node embeddings and the subgraph-edge embeddings.

The computer can determine the subgraph embeddings using the aggregated node messages and the aggregated edge messages (e.g., $g_{X,c}$), a learnable weight matrix ($W_X$), and an activation function ($\sigma$). For example, the embedding of the subgraph $$S_v'$$

is determined as follows.

$$h_{X,c} \leftarrow \sigma(W_X \cdot [g_{X,c}; h_{X,c}]) \tag{19}$$

After determining the subgraph embedding, the computer can perform the steps following S521, as illustrated in FIG. 5. For example, the final updated $h_{X,c}$ is then passed to embedding projection such that the embedding across times are in the same coherent space, and then aggregated through a recurrent neural network and lastly passed to a fully-connected layer to predict the underlying periodicity of the subgraph.

A summarized version of the training process method of the proposed system is illustrated in Algorithm 1, below.

Algorithm 1: Example training process $p_v \leftarrow$ determine node periodicity;

$p_e \leftarrow$ determine edge periodicity;

S ← extract frequent subgraph patterns with gSpan;

For t = 1 . . . $\mathcal{T}$ do $X_v(t) \leftarrow$ initialize node embeddings with node2vec at time t $X_e(t) \leftarrow$ initialize edge embeddings with edge2vec at time t;

end

For t = 1 . . . $\mathcal{T} - 1$ do $X_v^*(t) \leftarrow$ project $X_v(t)$ with $W_v^{t \to \mathcal{T}}$;

$X_e^*(t) \leftarrow$ project $X_v(t)$ with $W_e^{t \to \mathcal{T}}$;

end $h_v$ aggregate all node embeddings across $\mathcal{T}$;

-continued

Algorithm 1: Example training process $h_e$ aggregate all edge embeddings across $\mathcal{T}$;
$\hat{p}_v$ output estimated periodicity score with $h_v$;
$\hat{p}_e$ output estimated periodicity score with $h_e$;
For t = 1 . . . $\mathcal{T}$ do $X_{sv}(t) \leftarrow$ generate subgraph−node−graph embeddings with $p_v$ and $X_v^*(t)$;

$X_{se}(t) \leftarrow$ generate subgraph−node−graph embeddings with $p_e$ and $X_e^*(t)$;

$X_s(t) \leftarrow$ combine $X_{sv}(t)$ and $X_{se}(t)$;
end
For t = 1 . . . $\mathcal{T}$ − 1 do $X_s^*(t) \leftarrow$ project $X_s(t)$ with $W_s^{t \to \mathcal{T}}$;

end
$h_s \leftarrow$ aggregate all subgraph embeddings across $\mathcal{T}$;
$\hat{p}_s \leftarrow$ output estimated periodicity score with $h_s$;

Embodiments were evaluated with both synthetic dataset and real-world datasets. For the real-world datasets, we used Enron email dataset [29] and arXiv citation dataset by Open Graph Benchmark [30]. We conducted the periodicity detection tasks for both binary classification and regression. The results are shown in Table II, below.

TABLE 2

Periodicity detection performance on synthetic datasets.

| Fuzzy | | Embedding Model | Accuracy | AUC | MSE |
|---|---|---|---|---|---|
| 0 | 0.5 | Embodiments | 95.60% | 98.52% | 0.1542 |
| | 0.5 | DynAE | 98.00% | 99.65% | 0.1494 |
| | 0.3 | Embodiments | 99.80% | 100.00% | 0.1039 |
| | 0.3 | DynAE | 70.60% | 89.93% | 0.0837 |
| | 0.1 | Embodiments | 99.60% | 99.91% | 0.1216 |
| | 0.1 | DynAE | 89.39% | 98.93% | 0.1101 |
| 1 | 0.5 | Embodiments | 98.20% | 99.99% | 0.1514 |
| | 0.5 | DynAE | 98.99% | 99.83% | 0.11 |
| | 0.3 | Embodiments | 98.79% | 99.53% | 0.1414 |
| | 0.3 | DynAE | 71.80% | 91.94% | 0.0795 |
| | 0.1 | Embodiments | 100.00% | 100.00% | 0.1135 |
| | 0.1 | DynAE | 91.60% | 94.32% | 0.0735 |

Figure 7:
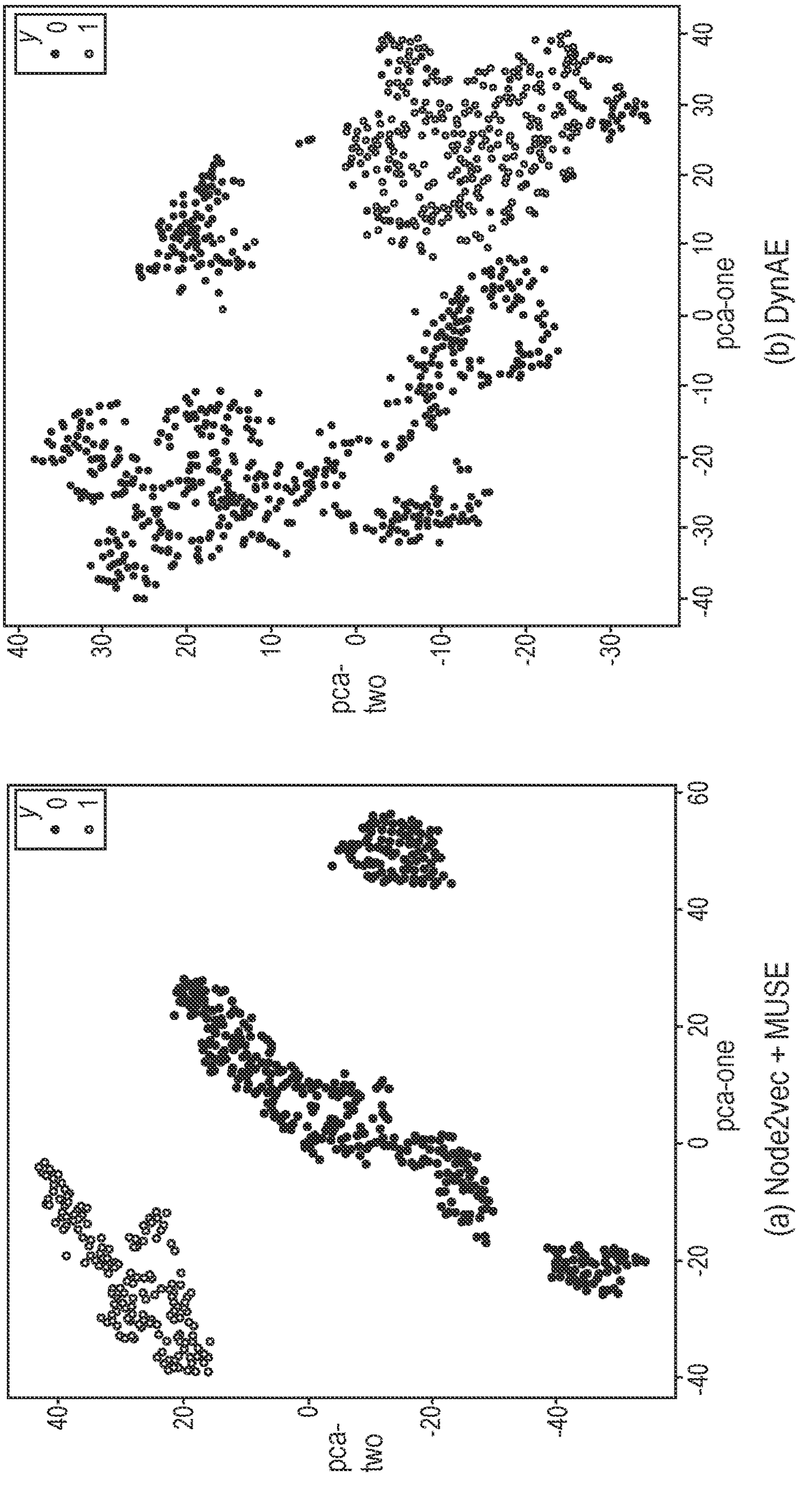
FIG. 7 shows data plot illustrating a comparison between node embeddings and underlying periodicity according to embodiments.

FIG. 7 shows data plot illustrating a comparison between node embeddings and underlying periodicity according to embodiments. FIG. 7 illustrates two different node embedding techniques and their output node embeddings. The modified Node2vec+MUSE node embedding process utilized by embodiments results in more easily identifiable node groupings that are grouped by periodicity when compared to the DynAE method.

REFERENCES

[1] C. Hauenschild, "Lunar periodicity," in Cold Spring Harbor Symposia on Quantitative Biology, vol. 25. Cold Spring Harbor Laboratory Press, 1960, pp. 491-497.

[2] J. J. SEPKOSKI, "Periodicity in extinction and the problem of catastrophism in the history of life," Journal of the Geological Society, vol. 146, no. 1, pp. 7-19, 1989.

[3] S. Karray, "Periodicity of pricing and marketing efforts in a distribution channel," European Journal of Operational Research, vol. 228, no. 3, pp. 635-647, 2013.

[4] A. Drutsa, G. Gusev, and P. Serdyukov, "Engagement periodicity in search engine usage: Analysis and its application to search quality evaluation," in Proceedings of the Eighth ACM International Conference on Web Search and Data Mining, WSDM 2015, Shanghai, China, Feb. 2-6, 2015, X. Cheng, H. Li, E. Gabrilovich, and J. Tang, Eds. ACM, 2015, pp. 27-36.

[5] I. R. Fischhoff, S. R. Sundaresan, J. Cordingley, and D. I. Rubenstein, "Habitat use and movements of plains zebra (*Equus burchelli*) in response to predation danger from lions," Behavioral Ecology, vol. 18, no. 4, pp. 725-729, 2007.

[6] M. G. Elfeky, W. G. Aref, and A. K. Elmagarmid, "Periodicity detection in time series databases," IEEE Trans. Knowl. Data Eng., vol. 17, no. 7, pp. 875-887, 2005. [Online]. Available: https://doi.org/10.1109/TKDE.2005.114

[7] M. G. Elfeky, et al., "WARP: time warping for periodicity detection," in Proceedings of the 5th IEEE International Conference on Data Mining (ICDM 2005), 27-30 Nov. 2005, Houston, Texas, USA. IEEE Computer Society, 2005, pp. 138-145. [Online]. Available: https://doi.org/10.1109/ICDM.2005.152

[8] Z. Li, J. Wang, and J. Han, "Mining event periodicity from incomplete observations," in The 18th ACM SIGKDD International Conference on Knowledge Discovery and Data Mining, KDD '12, Beijing, China, Aug. 12-16, 2012, Q. Yang, D. Agarwal, and J. Pei, Eds. ACM, 2012, pp. 444-452. [Online]. Available: https://doi.org/10.1145/2339530.2339604

[9] Zhenhui Li, et al., "eperiodicity: Mining event periodicity from incomplete observations," IEEE Trans. Knowl. Data Eng., vol. 27, no. 5, pp. 1219-1232, 2015. [Online]. Available: https://doi.org/10.1109/TKDE.2014.2365801

[10] A. Ahmed, N. Shervashidze, S. M. Narayanamurthy, V. Josifovski, and A. J. Smola, "Distributed large-scale natural graph factorization," in 22nd International World Wide Web Conference, WWW '13, Rio de Janeiro, Brazil, May 13-17, 2013, D. Schwabe, V. A. F. Almeida, H. Glaser, R. Baeza-Yates, and S. B. Moon, Eds. International World Wide Web Conferences Steering Committee/ACM, 2013, pp. 37-48.

[11] M. Belkin and P. Niyogi, "Laplacian eigenmaps and spectral techniques for embedding and clustering," in Advances in Neural Information Processing Systems 14 [Neural Information Processing Systems: Natural and Synthetic, NIPS 2001 Dec. 3-8, 2001, Vancouver, British Columbia, Canada], T. G. Dietterich, S. Becker, and Z. Ghahramani, Eds. MIT Press, 2001, pp. 585-591.

[12] S. Cao, W. Lu, and Q. Xu, "Grarep: Learning graph representations with global structural information," in Proceedings of the 24th ACM International Conference on Information and Knowledge Management, CIKM 2015, Melbourne, VIC, Australia, Oct. 19-23, 2015, J. Bailey, A. Moffat, C. C. Aggarwal, M. de Rijke, R. Kumar, V. Murdock, T. K. Sellis, and J. X. Yu, Eds. ACM, 2015, pp. 891-900.

[13] B. Perozzi, R. Al-Rfou, and S. Skiena, "Deepwalk: online learning of social representations," in The 20th ACM SIGKDD International Conference on Knowledge Discovery and Data Mining, KDD '14, New York, NY, USA—Aug. 24-27, 2014, S. A. Macskassy, C. Perlich, J. Leskovec, W. Wang, and R. Ghani, Eds. ACM, 2014, pp. 701-710.

[14] J. Tang, M. Qu, M. Wang, M. Zhang, J. Yan, and Q. Mei, "LINE: large-scale information network embedding," in Proceedings of the 24th International Conference on World Wide Web, WWW 2015, Florence, Italy, May 18-22, 2015, A. Gangemi, S. Leonardi, and A. Panconesi, Eds. ACM, 2015, pp. 1067-1077.

[15] A. Grover and J. Leskovec, "node2vec: Scalable feature learning for networks," in Proceedings of the 22nd ACM SIGKDD International Conference on Knowledge Discovery and Data Mining, San Francisco, CA, USA, Aug. 13-17, 2016, B. Krishnapuram, M. Shah, A. J. Smola, C. C. Aggarwal, D. Shen, and R. Rastogi, Eds. ACM, 2016, pp. 855-864.

[16] P. Goyal, N. Kamra, X. He, and Y. Liu, "Dyngem: Deep embedding method for dynamic graphs," arXiv preprint arXiv: 1805.11273, 2018.

[17] A. Sankar, Y. Wu, L. Gou, W. Zhang, and H. Yang, "Dysat: Deep neural representation learning on dynamic graphs via self-attention networks," in WSDM '20: The Thirteenth ACM International Conference on Web Search and Data Mining, Houston, TX, USA, Feb. 3-7, 2020, J. Caverlee, X. B. Hu, M. Lalmas, and W. Wang, Eds. ACM, 2020, pp. 519-527.

[18] P. Goyal, S. R. Chhetri, and A. Canedo, "dyngraph2vec: Capturing network dynamics using dynamic graph representation learning," Knowl. Based Syst., vol. 187, 2020.

[19] M. G. Sohrab, T. Nakata, M. Miwa, and Y. Sasaki, "EDGE2VEC: edge representations for large-scale scalable hierarchical learning," Computaci'on y Sistemas, vol. 21, no. 4, 2017. [Online]. Available: http://www.cys.cic.ipn.mx/ojs/index.php/CyS/article/view/2849

[20] Z. Gao, G. Fu, C. Ouyang, S. Tsutsui, X. Liu, J. J. Yang, C. Gessner, B. Foote, D. J. Wild, Y. Ding, and Q. Yu, "edge2vec: Representation learning using edge semantics for biomedical knowledge discovery," BMC Bioinform., vol. 20, no. 1, pp. 306:1-306:15, 2019. [Online]. Available: https://doi.org/10.1186/s12859-019-2914-2

[21] C. Wang, C. Wang, Z. Wang, X. Ye, and P. S. Yu, "Edge2vec: Edge-based social network embedding," ACM Trans. Knowl. Discov. Data, vol. 14, no. 4, pp. 45:1-45:24, 2020. [Online]. Available: https://doi.org/10.1145/3391298

[22] E. Alsentzer, S. G. Finlayson, M. M. Li, and M. Zitnik, "Subgraph neural networks," in Advances in Neural Information Processing Systems 33: Annual Conference on Neural Information Processing Systems 2020, NeurIPS 2020 Dec. 6-12, 2020, virtual, H. Larochelle, M. Ranzato, R. Hadsell, M. Balcan, and H. Lin, Eds., 2020.

[23] L. Chen, J. Li, C. Sahinalp, M. Marathe, A. Vullikanti, A. Nikolaev, E. Smirnov, R. Israfilov, and J. Qiu, "Subgraph2vec: Highlyvectorized tree-like subgraph counting," in 2019 IEEE International Conference on Big Data (Big Data), Los Angeles, CA, USA, Dec. 9-12, 2019, C. Baru, J. Huan, L. Khan, X. Hu, R. Ak, Y. Tian, R. S. Barga, C. Zaniolo, K. Lee, and Y. F. Ye, Eds. IEEE, 2019, pp. 483-492. [Online]. Available: https://doi.org/10.1109/BigData47090.2019.9006037

[24] G. Lample, A. Conneau, M. Ranzato, L. Denoyer, and H. J'egou, "Word translation without parallel data," in 6th International Conference on Learning Representations, ICLR 2018, Vancouver, BC, Canada, Apr. 30-May 3, 2018, Conference Track Proceedings. OpenReview.net, 2018.

[25] C. D. Barros, M. R. Mendonc, a, A. B. Vieira, and A. Ziviani, "A survey on embedding dynamic graphs," arXiv preprint arXiv: 2101.01229, 2021.

[26] T. Mikolov, I. Sutskever, K. Chen, G. S. Corrado, and J. Dean, "Distributed representations of words and phrases and their compositionality," in Advances in Neural Information Processing Systems 26: 27th Annual Conference on Neural Information Processing Systems 2013. Proceedings of a meeting held Dec. 5-8, 2013, Lake Tahoe, Nevada, United States, C. J. C. Burges, L. Bottou, Z. Ghahramani, and K. Q. Weinberger, Eds., 2013, pp. 3111-3119.

[27] J. Gilmer, S. S. Schoenholz, P. F. Riley, O. Vinyals, and G. E. Dahl, "Neural message passing for quantum chemistry," in Proceedings of the 34th International Conference on Machine Learning, ICML 2017, Sydney, NSW, Australia, 6-11 Aug. 2017, ser. Proceedings of Machine Learning Research, D. Precup and Y. W. Teh, Eds., vol. 70. PMLR, 2017, pp. 1263-1272. [Online]. Available: http://proceedings.mlr.press/v70/gilmer17a.html

[28] X. Yan and J. Han, "gspan: Graph-based substructure pattern mining," in Proceedings of the 2002 IEEE International Conference on Data Mining (ICDM 2002), 9-12 Dec. 2002, Maebashi City, Japan. IEEE Computer Society, 2002, pp. 721-724. [Online]. Available: https://doi.org/10.1109/ICDM.2002.1184038

[29] B. Klimt and Y. Yang, "The enron corpus: A new dataset for email classification research," in European Conference on Machine Learning. Springer, 2004, pp. 217-226.

[30] W. Hu, M. Fey, M. Zitnik, Y. Dong, H. Ren, B. Liu, M. Catasta, and J. Leskovec, "Open graph benchmark: Datasets for machine learning on graphs," in Advances in Neural Information Processing Systems 33: Annual Conference on Neural Information Processing Systems 2020, NeurIPS 2020 Dec. 6-12, 2020, virtual, H. Larochelle, M. Ranzato, R. Hadsell, M. Balcan, and H. Lin, Eds., 2020.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:

obtaining, by a computer, node embeddings and node periodicity classifications for a plurality of nodes in a graph, and edge embeddings and edge periodicity classifications for a plurality of edges in the graph for each time of a time period, wherein obtaining the node embeddings and the node periodicity classifications for the plurality of nodes in the graph, and the edge embeddings and the edge periodicity classifications for the plurality of edges in the graph for each time of the time period further comprises:

determining, by the computer, the node embeddings for the plurality of nodes;

determining, by the computer, the edge embeddings for the plurality of edges, wherein the plurality of nodes and the plurality of edges form the graph;

translating, by the computer, each node embedding of the node embeddings for each time of the time period into projected node embeddings;

translating, by the computer, each edge embedding of the edge embeddings for each time of the time period into projected edge embeddings;

for each node in the plurality of nodes, aggregating, by the computer, the projected node embeddings for that node into an aggregated node embedding;

for each edge in the plurality of edges, aggregating, by the computer, the projected edge embeddings into an aggregated edge embedding;

for each node in the plurality of nodes, classifying, by the computer, the aggregated node embedding as being periodic or not periodic to produce the node periodicity classifications; and for each edge in the plurality of edges, classifying, by the computer, the aggregated edge embedding as being periodic or not periodic to produce the edge periodicity classifications;

determining, by the computer, subgraph embeddings based on a subgraph of the graph, times in the time period, the node embeddings for nodes in the subgraph, the edge embeddings for edges in the subgraph, the node periodicity classifications for the nodes in the subgraph, and the edge periodicity classifications for the edges in the subgraph;

translating, by the computer, each subgraph embedding of the subgraph embeddings for each time of the time period into projected subgraph embeddings of a plurality of projected subgraph embeddings;

for the subgraph, aggregating, by the computer, the plurality of projected subgraph embeddings into an aggregated subgraph embedding;

determining, by the computer, if the subgraph is periodic based upon at least the aggregated subgraph embedding; and outputting an estimated periodicity score.

2. The method of claim 1, wherein aggregating the projected node embeddings and aggregating the projected edge embeddings further comprises:

inputting, by the computer, the projected node embeddings into a first recurrent neural network to aggregate each node sequence of embeddings throughout the time period; and inputting, by the computer, the projected edge embeddings into a second recurrent neural network to aggregate each edge sequence of embeddings throughout the time period.

3. The method of claim 1, wherein classifying the aggregated node embedding and classifying the aggregated edge embedding further comprises:

performing, by the computer, a binary machine learning classification process.

4. The method of claim 1, wherein determining the subgraph embeddings further comprises:

determining, by the computer, the subgraph of the graph;

decomposing, by the computer, the subgraph into a subnode graph comprising the nodes of the plurality of nodes in the subgraph, and a sub-edge graph comprising the edges of the plurality of edges in the subgraph;

determining, by the computer, a plurality of node messages from anchor nodes in the subgraph using the node embeddings;

determining, by the computer, a plurality of edge messages from anchor edges in the subgraph using the edge embeddings;

aggregating, by the computer, the plurality of node messages weighted by the node periodicity classifications;

aggregating, by the computer, the plurality of edge messages weighted by the edge periodicity classifications; and determining, by the computer, the subgraph embeddings using the aggregated plurality of node messages, the aggregated plurality of edge messages, a learnable weight matrix and an activation function.

5. The method of claim 1, wherein determining if the subgraph is periodic further comprises:

determining, by the computer, the estimated periodicity score based on the aggregated subgraph embedding.

6. The method of claim 1, wherein determining if the subgraph is periodic further comprises:

determining, by the computer, the estimated periodicity score based upon at least the aggregated subgraph embedding;

determining, by the computer, whether or not the estimated periodicity score exceeds a periodicity score threshold; and if the estimated periodicity score exceeds the periodicity score threshold, outputting, by the computer, an indication that the subgraph is periodic.

7. The method of claim 1, wherein the graph is a dynamic graph, the node periodicity classifications are binary node periodicity classifications, and the edge periodicity classifications are binary edge periodicity classifications.

8. The method of claim 1, further comprising:

determining, by the computer, a plurality of subgraphs from the graph based on a subgraph pattern mining learning process; and selecting, by the computer, the subgraph from the plurality of subgraphs.

9. A computer comprising:

a processor; and a computer-readable medium coupled to the processor, the computer-readable medium comprising code executable by the processor for implementing a method comprising:

obtaining node embeddings and node periodicity classifications for a plurality of nodes in a graph, and edge embeddings and edge periodicity classifications for a plurality of edges in the graph for each time of a time period, wherein obtaining the node embeddings and the node periodicity classifications for the plurality of nodes in the graph, and the edge embeddings and the edge periodicity classifications for the plurality of edges in the graph for each time of the time period further comprises:

determining, by the computer, the node embeddings for the plurality of nodes;

determining, by the computer, the edge embeddings for the plurality of edges, wherein the plurality of nodes and the plurality of edges form the graph;

translating, by the computer, each node embedding of the node embeddings for each time of the time period into projected node embeddings;

translating, by the computer, each edge embedding of the edge embeddings for each time of the time period into projected edge embeddings;

for each node in the plurality of nodes, aggregating, by the computer, the projected node embeddings for that node into an aggregated node embedding;

for each edge in the plurality of edges, aggregating, by the computer, the projected edge embeddings into an aggregated edge embedding;

for each node in the plurality of nodes, classifying, by the computer, the aggregated node embedding as being periodic or not periodic to produce the node periodicity classifications; and for each edge in the plurality of edges, classifying, by the computer, the aggregated edge embedding as being periodic or not periodic to produce the edge periodicity classifications;

determining subgraph embeddings based on a subgraph of the graph, times in the time period, the node embeddings for nodes in the subgraph, and the edge embeddings for edges in the subgraph, the node periodicity classifications for the nodes in the subgraph, and the edge periodicity classifications for the edges in the subgraph;

translating each subgraph embedding the subgraph embeddings for each time of the time period into projected subgraph embeddings of a plurality of projected subgraph embeddings;

for the subgraph, aggregating the plurality of projected subgraph embeddings into an aggregated subgraph embedding;

determining if the subgraph is periodic based upon at least the aggregated subgraph embedding; and outputting an estimated periodicity score.

10. The computer of claim 9, wherein the estimated periodicity score indicates a periodicity of the subgraph.

11. The computer of claim 9, wherein obtaining the node embeddings and the node periodicity classifications for the plurality of nodes in the graph, and the edge embeddings and the edge periodicity classifications for the plurality of edges in the graph for each time of the time period further comprises:

determining the node embeddings for the plurality of nodes using a static node embedding process including a random walk sampling during a machine learning process; and determining the edge embeddings for the plurality of edges based on training a machine learning model.

12. The computer of claim 9, wherein the method further comprises:

determining the subgraph of the graph using a subgraph pattern mining learning process.

13. The computer of claim 9, wherein determining the subgraph embeddings further comprises:

determining the subgraph of the graph;

decomposing the subgraph into a sub-node graph comprising the nodes of the plurality of nodes in the subgraph, and a sub-edge graph comprising the edges of the plurality of edges in the subgraph;

determining a plurality of node messages from anchor nodes in the subgraph using the node embeddings;

determining a plurality of edge messages from anchor edges in the subgraph using the edge embeddings;

aggregating the plurality of node messages weighted by the node periodicity classifications;

aggregating the plurality of edge messages weighted by the edge periodicity classifications; and determining the subgraph embeddings using the aggregated plurality of node messages, the aggregated edge messages, a learnable weight matrix and an activation function.

14. The computer of claim 9, wherein the computer is a data analysis computer, the graph is a dynamic graph, the plurality of nodes in the graph represent resources providers and users, and the plurality of edges in the graph represent interactions between the resource providers and the users.

15. The computer of claim 9, wherein the method further comprises:

determining the edge embeddings using a machine learning process that optimizes a loss function that takes into account global edge proximity, local edge proximity, and all-time edge proximity.

16. A system comprising:

a plurality of devices;

a database; and a data analysis computer comprising:

a processor; and a computer-readable medium coupled to the processor, the computer-readable medium comprising code executable by the processor for implementing a method comprising:

obtaining, from the database, node embeddings and node periodicity classifications for a plurality of nodes in a graph, and edge embeddings and edge periodicity classifications for a plurality of edges in the graph for each time of a time period, wherein obtaining the node embeddings and the node periodicity classifications for the plurality of nodes in the graph, and the edge embeddings and the edge periodicity classifications for the plurality of edges in the graph for each time of the time period further comprises:

determining, by the computer, the node embeddings for the plurality of nodes;

determining, by the computer, the edge embeddings for the plurality of edges, wherein the plurality of nodes and the plurality of edges form the graph;

translating, by the computer, each node embedding of the node embeddings for each time of the time period into projected node embeddings;

translating, by the computer, each edge embedding of the edge embeddings for each time of the time period into projected edge embeddings;

for each node in the plurality of nodes, aggregating, by the computer, the projected node embeddings for that node into an aggregated node embedding;

for each edge in the plurality of edges, aggregating, by the computer, the projected edge embeddings into an aggregated edge embedding;

for each node in the plurality of nodes, classifying, by the computer, the aggregated node embedding as being periodic or not periodic to produce the node periodicity classifications; and for each edge in the plurality of edges, classifying, by the computer, the aggregated edge embedding as being periodic or not periodic to produce the edge periodicity classifications;

determining subgraph embeddings based on a subgraph of the graph, times in the time period, the node embeddings for nodes in the subgraph, and the edge embeddings for edges in the subgraph, the node periodicity classifications for the nodes in the subgraph, and the edge periodicity classifications for the edges in the subgraph;

translating each subgraph embedding the subgraph embeddings for each time of the time period into projected subgraph embeddings of a plurality of projected subgraph embeddings;

for the subgraph, aggregating the plurality of projected subgraph embeddings into an aggregated subgraph embedding;

determining if the subgraph is periodic based upon at least the aggregated subgraph embedding; and outputting an estimated periodicity score.

17. The system of claim 16, wherein the plurality of nodes in the graph represent the plurality of devices, and wherein the plurality of edges in the graph represent interactions between the plurality of devices and resource provider devices.

18. The system of claim 16, wherein determining the subgraph embeddings further comprises:

determining the subgraph of the graph using a subgraph pattern mining learning process;

decomposing the subgraph into a sub-node graph comprising the nodes of the plurality of nodes in the subgraph, and a sub-edge graph comprising the edges of the plurality of edges in the subgraph;

determining a plurality of node messages from anchor nodes in the subgraph using the node embeddings;

determining a plurality of edge messages from anchor edges in the subgraph using the edge embeddings;

aggregating the plurality of node messages weighted by the node periodicity classifications;

aggregating the plurality of edge messages weighted by the edge periodicity classifications; and determining the subgraph embeddings using the aggregated node messages, the aggregated edge messages, a learnable weight matrix and an activation function.

* * * * *